United States Patent
Gaal et al.

(10) Patent No.: US 10,757,042 B2
(45) Date of Patent: Aug. 25, 2020

(54) BUFFER MANAGEMENT FOR MULTIPLE RADIO ACCESS TECHNOLOGIES

(71) Applicant: QUALCOMM Incorporated, San Diego, CA (US)

(72) Inventors: Peter Gaal, San Diego, CA (US); Wanshi Chen, San Diego, CA (US); Heechoon Lee, San Diego, CA (US); Tingfang Ji, San Diego, CA (US); Joseph Binamira Soriaga, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 16/032,824

(22) Filed: Jul. 11, 2018

(65) Prior Publication Data

US 2019/0052582 A1 Feb. 14, 2019

Related U.S. Application Data

(60) Provisional application No. 62/544,768, filed on Aug. 11, 2017.

(51) Int. Cl.
 *H04L 12/861* (2013.01)
 *H04L 1/18* (2006.01)
 (Continued)

(52) U.S. Cl.
 CPC ........ *H04L 49/9005* (2013.01); *H04L 1/1812* (2013.01); *H04L 1/1825* (2013.01);
 (Continued)

(58) Field of Classification Search
 None
 See application file for complete search history.

(56) References Cited

U.S. PATENT DOCUMENTS

2015/0124740 A1* 5/2015 Chen ................... H04L 27/0006
 370/329
2016/0204907 A1* 7/2016 Chen ..................... H04L 1/1835
 370/328

OTHER PUBLICATIONS

Huawei et al., "Soft Buffer Size Allocation for Rel-10 downlink", 3GPP Draft; R1-106513 SoFt_Buffer_Allocation_DL, 3rd Generation Partnership Project (3GPP), Mobile Competence Centre; 650, Route Des Lucioles; F-06921 Sophia-Antipolis Cedex; France, vol. RAN WG1, No. Jacksonville, USA; Nov. 11, 2010, Nov. 19, 2010, [retrieved on Nov. 19, 2010], 3 pages.

(Continued)

*Primary Examiner* — Christopher M Crutchfield
*Assistant Examiner* — Alan L Lindenbaum
(74) *Attorney, Agent, or Firm* — Dalei Dong; Patterson & Sheridan LLP

(57) ABSTRACT

Certain aspects of the present disclosure relate to methods and apparatus for buffer management for a user equipment (UE) for multiple radio access technologies (RATs). Certain aspects provide transmitting data using a first RAT and second RAT to the UE based on an assumed size of a first portion of a buffer at the UE assumed allocated for storing data received by the UE using the first RAT and an assumed size of a second portion of the buffer assumed allocated for storing data received by the UE using the second RAT. The size of the first portion is based on a first number of resources the UE is capable of using for communicating and a second number of resources the UE is configured or allocated to use. The size of the second portion is based on an overall size of the buffer and the size of the first portion.

30 Claims, 10 Drawing Sheets

(51) Int. Cl.
    *H04L 5/00*            (2006.01)
    *H04W 8/24*           (2009.01)
    *H04W 72/04*          (2009.01)
    *H04W 88/06*          (2009.01)

(52) U.S. Cl.
    CPC .......... *H04L 1/1835* (2013.01); *H04L 1/1887* (2013.01); *H04L 1/1893* (2013.01); *H04L 5/0044* (2013.01); *H04L 5/0058* (2013.01); *H04L 49/9052* (2013.01); *H04W 8/24* (2013.01); *H04W 72/042* (2013.01); *H04W 88/06* (2013.01); *H04L 5/001* (2013.01); *H04W 72/048* (2013.01)

(56) References Cited

OTHER PUBLICATIONS

International Search Report and Written Opinion—PCT/US2018/041873—ISA/EPO—dated Oct. 11, 2018.
NTT DOCOMO: "Soft Buffer Partitioning and Rate Matching for Downlink CA", 3GPP Draft; R1-110555 Soft Buffer for CA REV, 3rd Generation Partnership Project (3GPP), Mobile Competence Centre; 650, Route Des Lucioles; F-06921 Sophia-Antipolis Cedex; France, vol. RAN WG1, No. Dublin, Ireland; Jan. 17, 2011, Jan. 24, 2011, [retrieved on Jan. 24, 2011], 10 pages.

* cited by examiner

BUFFER MANAGEMENT FOR MULTIPLE RADIO ACCESS TECHNOLOGIES

CROSS-REFERENCE TO RELATED APPLICATIONS

This application claims the benefit of U.S. Provisional Patent No. 62/544,768, filed Aug. 11, 2017. The content of the provisional application is hereby incorporated by reference in its entirety.

INTRODUCTION

Aspects of the present disclosure relate to communication systems, and more particularly, to systems and methods for signaling mode changes to a plurality of wireless devices.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for buffer management for a user equipment (UE) for multiple radio access technologies. The method includes receiving, at a base station (BS) from the UE, information indicative of an overall size of a buffer at the UE for storing data received from the BS and a first number of resources the UE is capable of using for communicating between the UE and the BS. The method further includes determining, by the BS, a second number of resources for communicating between the UE and the BS based on the received information. The method further includes transmitting, by the BS, a first encoded data using a first radio access technology (RAT) and a second encoded data using a second RAT to the UE. The bits for the first encoded data are based on an assumed size of a first portion of the buffer assumed allocated for storing data received by the UE using the first RAT. The size of the first portion is based on the first number of resources and the second number of resources. The bits for the second encoded data are based on an assumed size of a second portion of the buffer assumed allocated for storing data received by the UE using the second RAT. The size of the second portion is based on the overall size of the buffer and the size of the first portion.

Certain aspects provide a method for buffer management at a user equipment (UE) for multiple radio access technologies. The method includes allocating, at the UE, a first portion of a buffer for storing data received by the UE using a first radio access technology (RAT), wherein a size of the first portion is based on a first number of resources allocated for communicating between the UE and a base station (BS) and a second number of resources the UE is capable of using for communicating between the UE and the BS. The method further includes allocating, at the UE, a second portion of the buffer for storing data received by the UE using a second RAT, wherein a size of the second portion is based on an overall size of the buffer and the size of the first portion. The method further includes storing data received by the UE using the first RAT in the first portion of the buffer. The method further includes storing data received by the UE using the second RAT in the second portion of the buffer.

Certain aspects provide a base station comprising a memory and a processor. The processor is configured to receive, from a user equipment (UE), information indicative of an overall size of a buffer at the UE for storing data received from the BS and a first number of resources the UE is capable of using for communicating between the UE and the BS using a first radio access technology (RAT). The processor is further configured to determine a second number of resources for communicating between the UE and the BS using the first RAT based on the received information. The processor is further configured to transmit first encoded data using the first RAT and second encoded data using a second RAT to the UE, wherein bits for the first encoded data are based on an assumed size of a first portion of the buffer assumed allocated for storing data received by the UE using the first RAT, wherein the assumed size of the first portion is based on the first number of resources and the second number of resources, and wherein bits for the second encoded data are based on an assumed size of a second portion of the buffer assumed allocated for storing data received by the UE using the second RAT, wherein the assumed size of the second portion is based on the overall size of the buffer and the assumed size of the first portion.

Certain aspects provide a base station. The base station comprises a means for receiving, from a user equipment (UE), information indicative of an overall size of a buffer at the UE for storing data received from the BS and a first number of resources the UE is capable of using for communicating between the UE and the BS using a first radio access technology (RAT). The base station further comprises a means for determining a second number of resources for communicating between the UE and the BS using the first RAT based on the received information. The base station further comprises a means for transmitting first encoded data using the first RAT and second encoded data using a second RAT to the UE, wherein bits for the first encoded data are based on an assumed size of a first portion of the buffer assumed allocated for storing data received by the UE using the first RAT, wherein the assumed size of the first portion is based on the first number of resources and the second number of resources, and wherein bits for the second encoded data are based on an assumed size of a second portion of the buffer assumed allocated for storing data received by the UE using the second RAT, wherein the assumed size of the second portion is based on the overall size of the buffer and the assumed size of the first portion.

Certain aspects provide a non-transitory computer readable storage medium that stores instructions that when executed by a base station (BS) causes the base station to perform a method for buffer management for a user equipment (UE) for multiple radio access technologies. The method includes receiving, at a base station (BS) from the UE, information indicative of an overall size of a buffer at the UE for storing data received from the BS and a first number of resources the UE is capable of using for communicating between the UE and the BS. The method further includes determining, by the BS, a second number of resources for communicating between the UE and the BS based on the received information. The method further includes transmitting, by the BS, a first encoded data using a first radio access technology (RAT) and a second encoded data using a second RAT to the UE. The bits for the first encoded data are based on an assumed size of a first portion of the buffer assumed allocated for storing data received by the UE using the first RAT. The size of the first portion is based on the first number of resources and the second number of resources. The bits for the second encoded data are based on an assumed size of a second portion of the buffer assumed allocated for storing data received by the UE using the second RAT. The size of the second portion is based on the overall size of the buffer and the size of the first portion.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
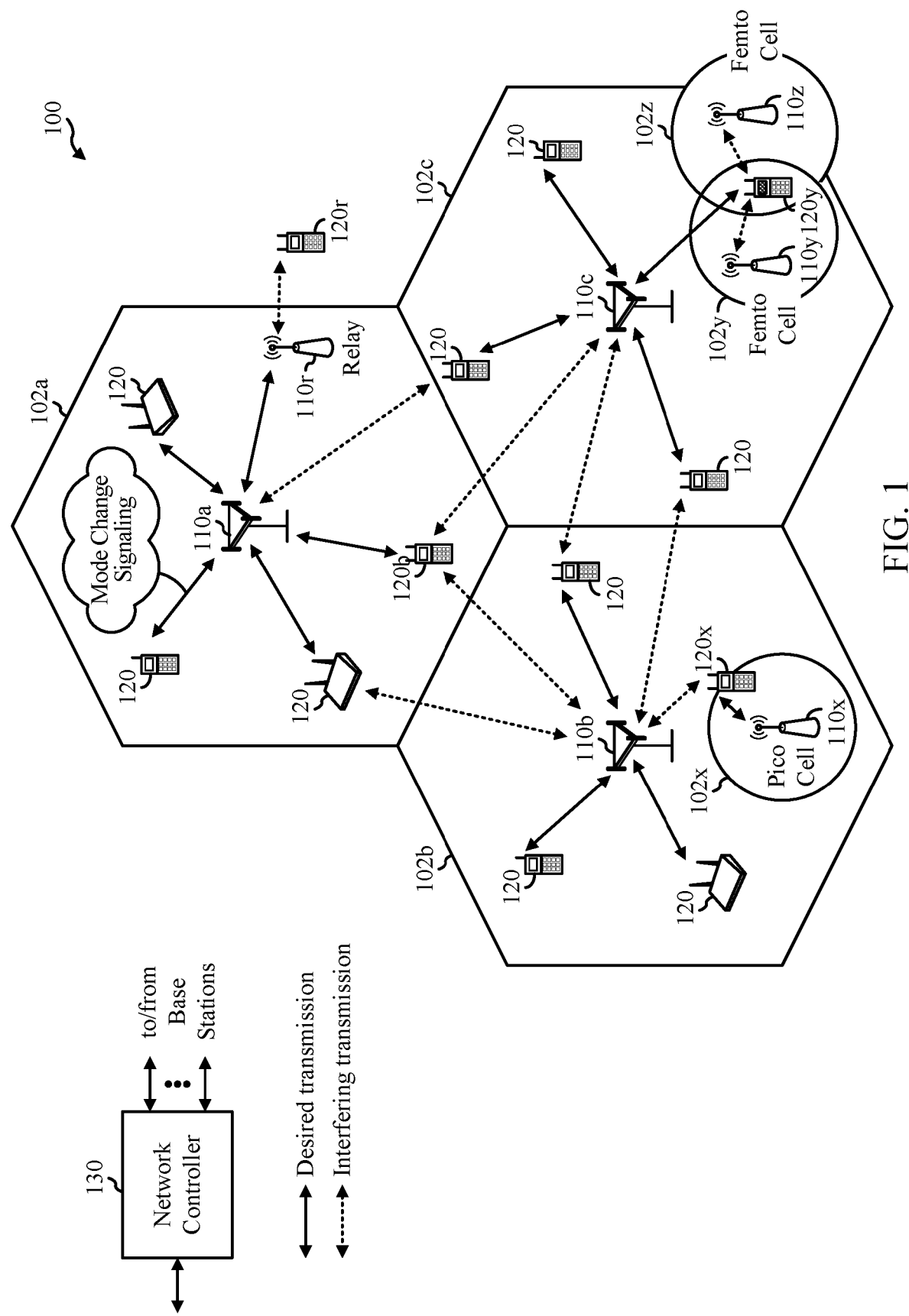
FIG. 1 is a block diagram conceptually illustrating an example telecommunications system, in accordance with certain aspects of the present disclosure.

Aspects of the present disclosure provide apparatus, methods, processing systems, and computer readable mediums for managing buffers (e.g., soft buffers) for a UE that are used for storing (e.g., buffering) encoded data (e.g., soft bits). For example, a BS and a UE may be configured to communicate in a network that supports multiple radio access technologies (RATs) (e.g., NR and LTE). Accordingly, the BS and UE may be configured to communicate using the multiple RATs. The UE may be configured to buffer encoded data received from the BS for the different RATs utilizing different buffers (e.g., at least one buffer for a first RAT and at least one buffer for a second RAT).

The UE may further be configured to transmit to the BS information indicative of capabilities of the UE including an indication of the buffer size of the different buffers at the UE. Based on the indication received, the BS assumes that the UE has certain size buffers and accordingly transmits encoded data to the UE based on the assumed size of the buffers. In particular, the BS may send an amount of encoded data that the BS assumes that the UE can buffer based on the size of the buffers. In aspects where the different buffers are utilized only for buffering encoded data for one RAT and not another, the BS may determine that there is not sufficient space in a buffer for a given RAT to transmit additional encoded data at a given time, even if there is space in another buffer for another RAT. Accordingly, certain aspects of the present disclosure relate to techniques for utilizing at the UE, and assuming utilization of at the BS, the buffer for one RAT for buffering data for another RAT, and vice versa.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. In certain aspects, as shown, a UE 120 may be configured to manage buffers of the UE 120 to store encoded data and the BS 110 may be configured to transmit encoded data to the UE 120 based on an assumption the UE 120 is managing the buffers, according to the techniques discussed herein.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed. BS 110 and/or UE 120 may support multiple RATs.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
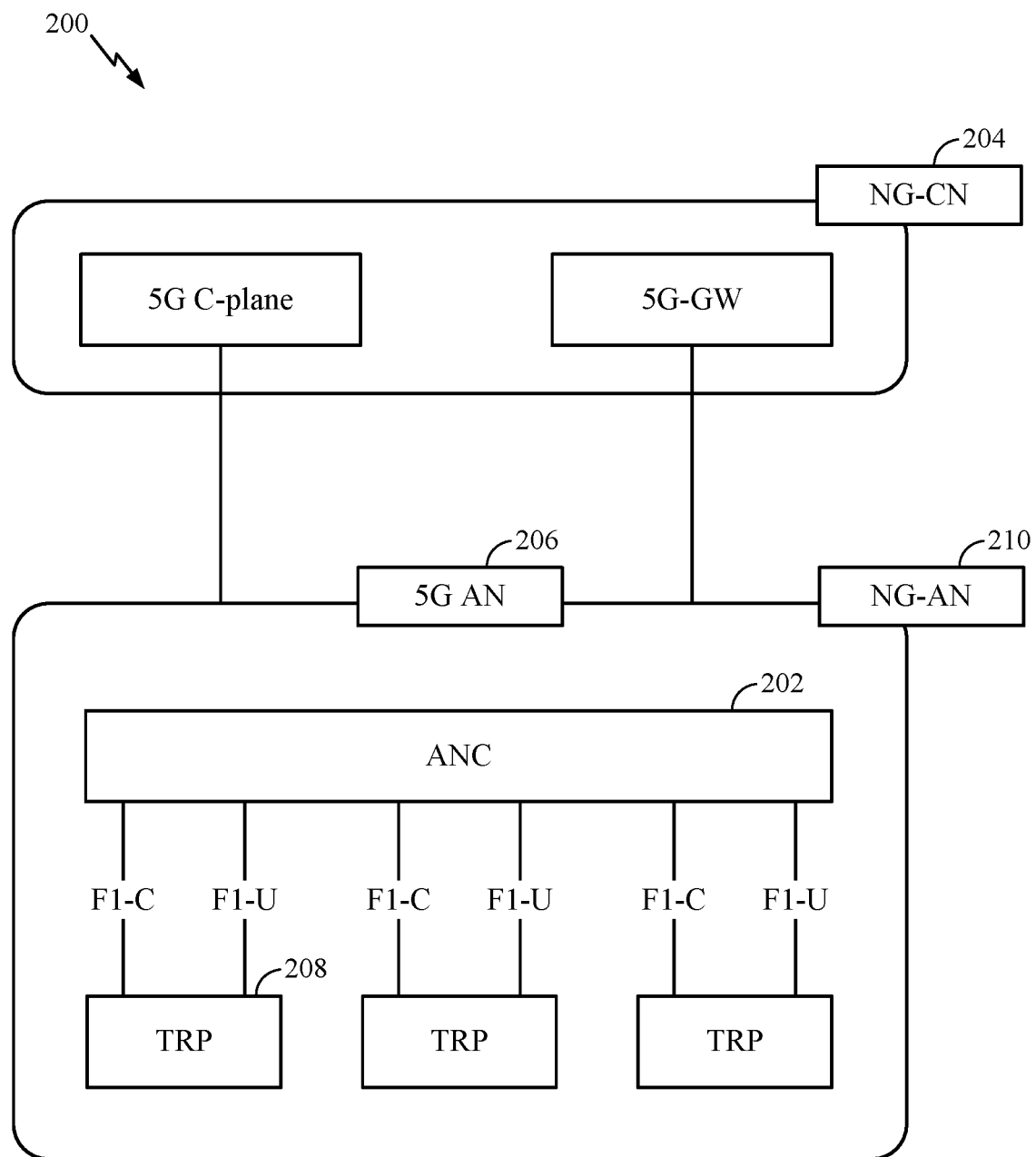
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
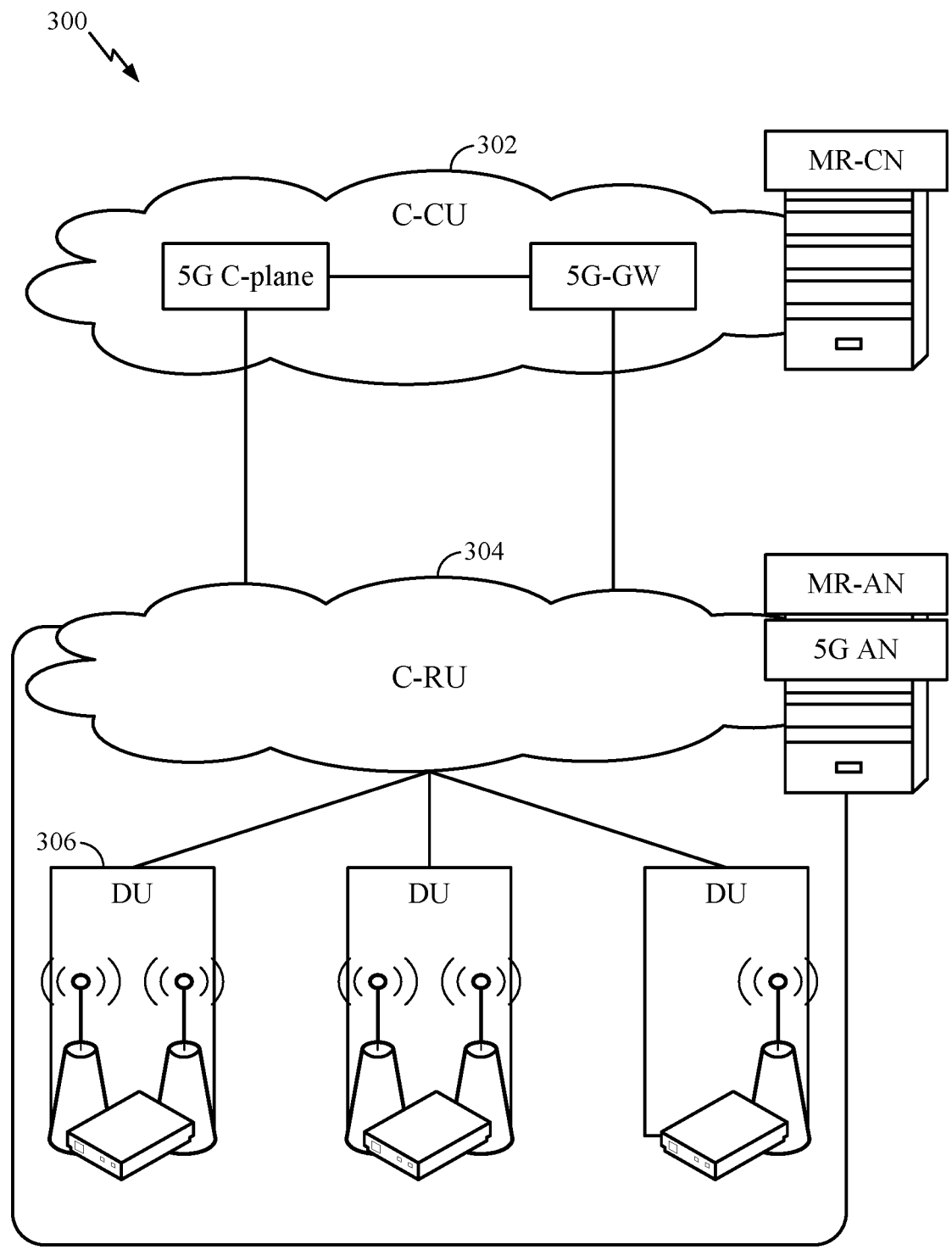
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
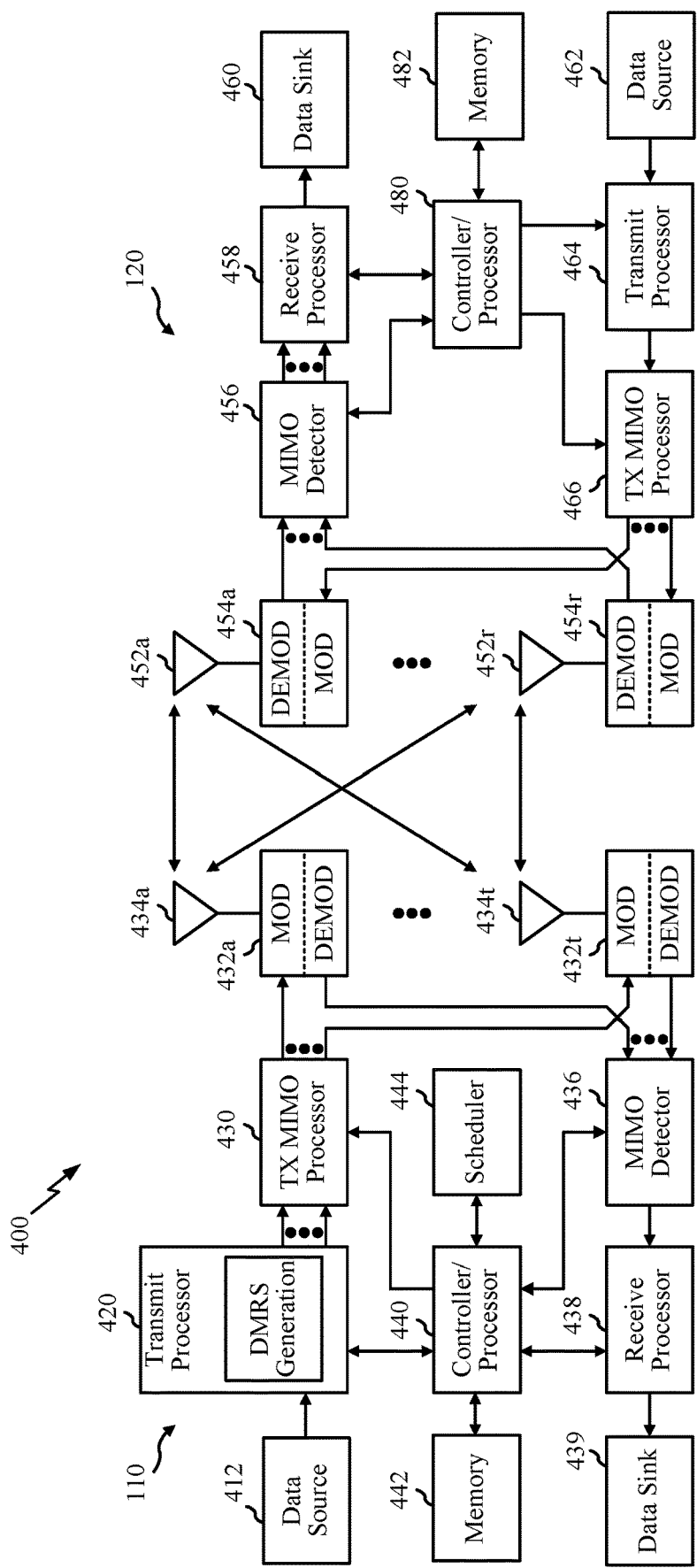
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein. For example, antennas 434, processors 420, 460, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480. The controller 480 may store received encoded data in memory 482, which may include multiple buffers associated with multiple RATs.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
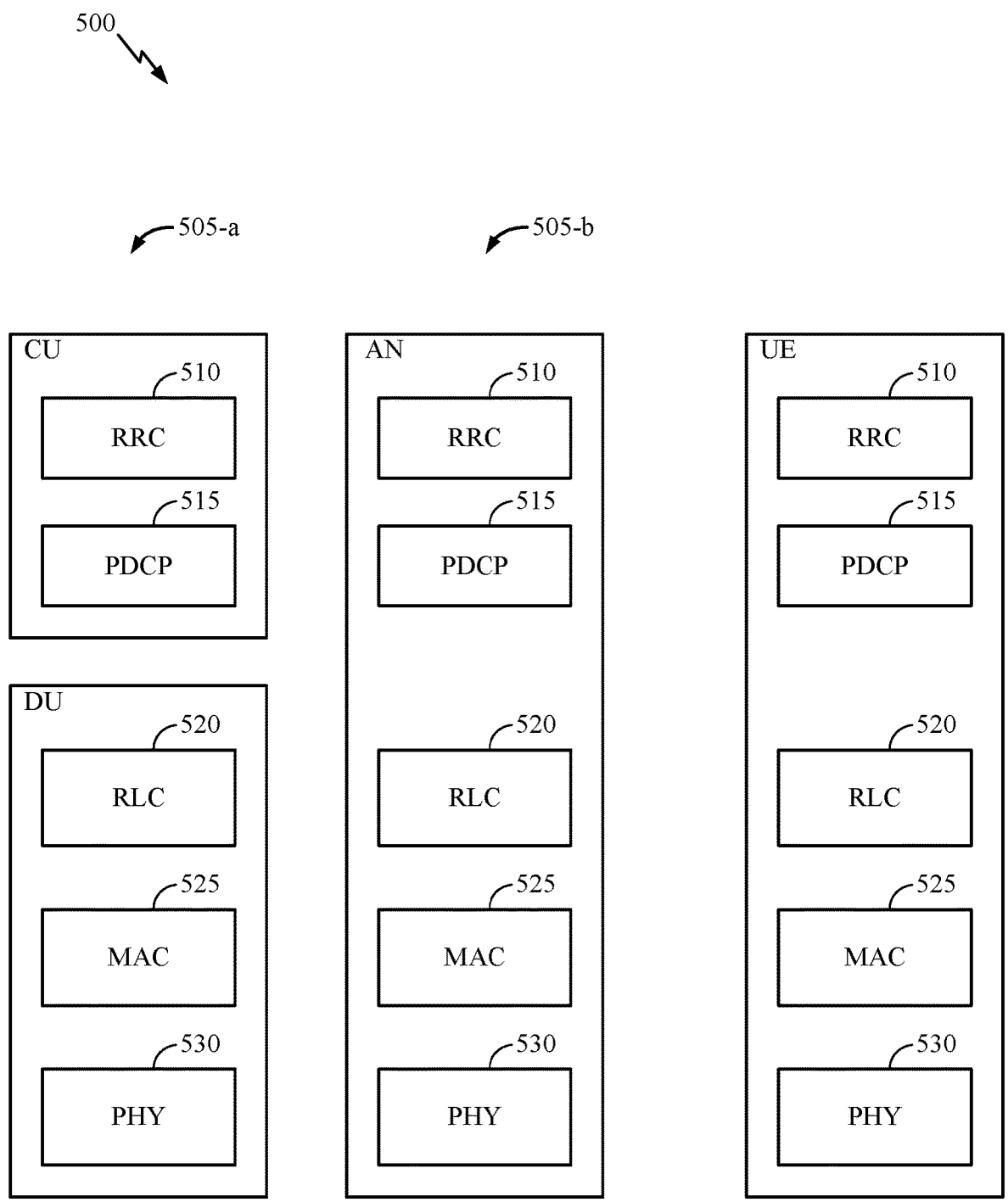
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-*b* may be useful in, for example, a femto cell deployment.

Regardless of whether a network access device implements part or all of a protocol stack, a UE may implement an entire protocol stack as shown in 505-*c* (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
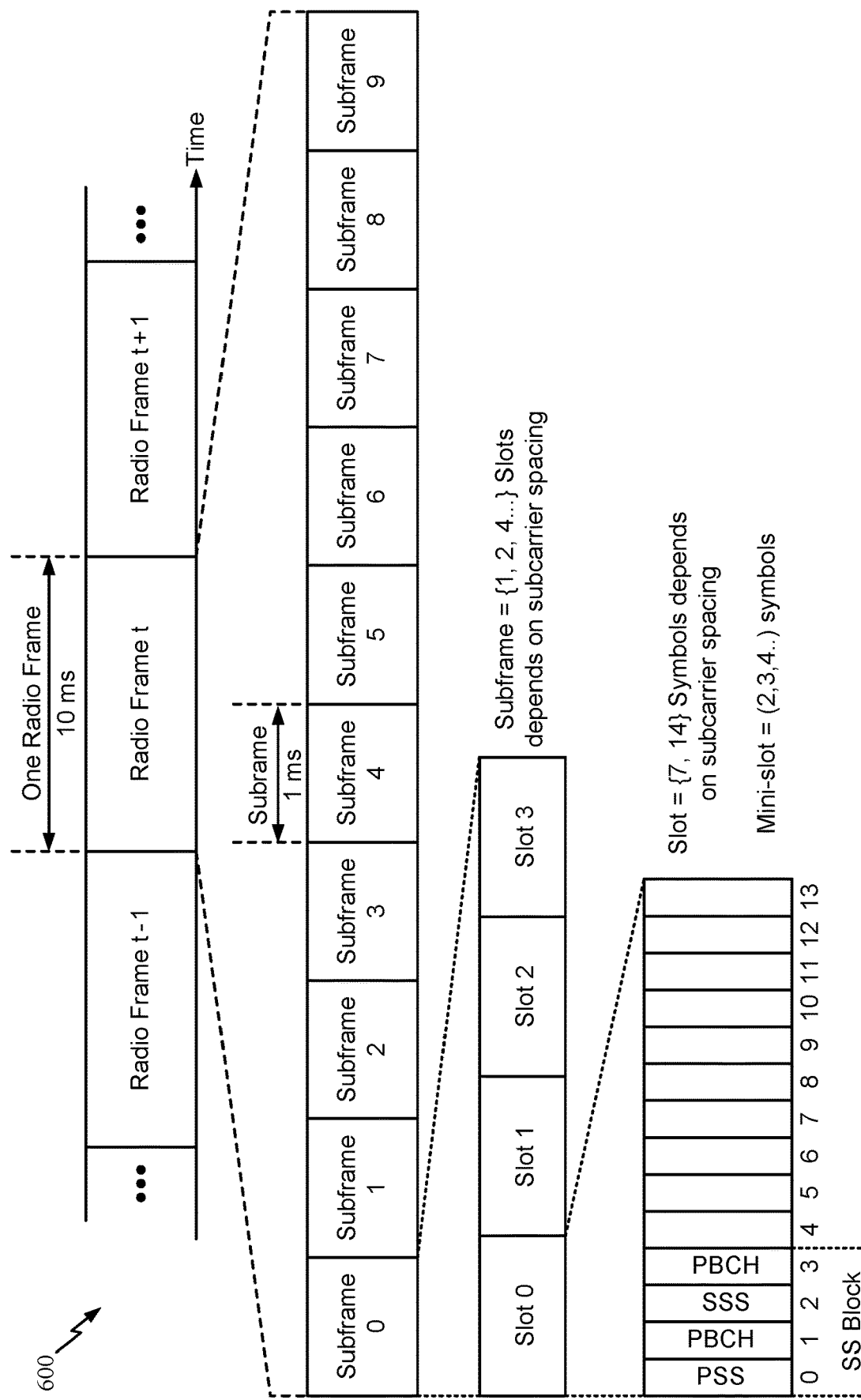
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Buffer Management

Aspects of the present disclosure relate to soft buffer management techniques for multiple RATs in a UE (e.g., UE 120) that are used for storing (e.g., buffering) soft bits. For example, in certain aspects, a base station (e.g., BS 110) and UE 120 may support carrier aggregation (CA), meaning the BS 110 and UE 120 can communicate over multiple frequencies (e.g., multiple ranges of frequencies of one or more bandwidths) referred to as carriers, or component carriers (CCs). These carriers may or may not be contiguous in frequency. When CA is used by the BS 110, the BS 110 supports a plurality of serving cells, one for each carrier. The coverage area of each serving cell may differ. In certain aspects, radio resource control (RRC) connection procedures (e.g., during handover, after a radio link failure (RLF), for initial connection, etc.) for the UE 120 connecting to the BS 110 are handled by the BS 110 using only one of the carriers (referred to as a primary carrier), which serves one of the cells referred to as the primary cell (PCell). The remaining cells are referred to as secondary cells (SCells) and are served by the remaining carriers (referred to as secondary carriers).

The UE 120 may further support Automatic Repeat reQuest (ARQ). In particular, in ARQ the UE 120 checks for errors in encoded data received from BS 110 and if the UE 120 detects an error, the UE 120 discards the encoded data and requests the BS 110 to retransmit the data to the UE 120. More specifically, the UE 120 may support hybrid ARQ (HARQ). In HARQ, if the UE 120 detects an error in encoded data received from BS 110 (e.g., during decoding of the encoded data), it does not discard the encoded data, but rather buffers the encoded data (e.g., as a "soft bit" or estimate of the actual value of the data) while still requesting the BS 110 to retransmit the encoded data to the UE 120. Upon receiving the retransmitted encoded data, the UE 120 combines the received retransmitted encoded data with the buffered encoded data, and then attempts to decode the combined encoded data and performs error detection. The UE 120, in certain aspects, may request and combine multiple retransmissions of a single transmission (e.g., transport block (TB), transmission corresponding to a TTI, etc.). By combining the retransmitted encoded data with the buffered encoded data, the performance for decoding the encoded data is improved. In certain aspects, the bits of encoded data retransmitted by BS 110 to the UE 120 during different portions of the HARQ procedure may be based on an assumption at the BS 110 of a size of a buffer at the UE 120. For example, the BS 110 may determine which encoded data to retransmit to UE 120 based on the size of the buffer at the UE 120 when receiving a retransmission request from UE 120.

In certain aspects, where the UE 120 and BS 110 communicate using CA, the UE 120 may store, in a soft buffer, encoded data corresponding to each of the CCs over which encoded data is communicated between UE 120 and BS 110. In addition, where the UE 120 and BS 110 support communicating over multiple spatial layers using spatial multiplexing, encoded data corresponding to each of the spatial layers may be stored in the soft buffer of the UE 120. Further, where the UE 120 and BS 110 communicate using multiple RATs (e.g., NR and LTE) at the same time (e.g., support dual connectivity (DC)), the UE 120 may have separate soft buffers for the different RATs, and the BS 110 may assume the UE 120 has separate soft buffers for the different RATs. Memory space for implementing soft buffers may be expensive (e.g., in terms of cost, silicon space, etc.) and therefore providing a large buffer capacity for each RAT may not always be feasible.

In certain aspects, the size of a soft buffer for a UE 120 is configurable, meaning that the amount of physical memory (e.g., of one or more types of volatile memory, such as cache, on-chip memory, off-chip memory, etc.) allocated for a soft buffer is configurable. In certain aspects, the size of a soft buffer for a UE 120 is statically defined based on a capability (e.g., category) of the UE 120. For example, in certain aspects, during connection (e.g., RRC connection procedures including RRC configuration) of the UE 120 to the BS 110, the UE 120 may transmit capability information for each of the multiple RATs used for communication to the BS 110. For example, different UEs 120 may have different capabilities, and therefore transmit the capability information to the BS 110. The capability information may indicate one or more of the following parameters: frequency domain bandwidth information (e.g., an indication of frequency bandwidth(s) the UE 120 can use for communication, such as a number of subcarriers (e.g., physical resource blocks)), time domain length information (e.g., numerology such as the slot length of a time slot the UE 120 uses for communication, subcarrier spacing, etc.), a number of CCs the UE can support for CA, a number of spatial layers the UE can support for communication, a modulation scheme the UE can support, etc. For example, the capability information may be an indication of a category associated with the various discussed parameters. A soft buffer size for a RAT for the UE 120 may be statically set based on the capability information for the RAT. For example, the BS 110 may assume the size of each soft buffer for each RAT at the UE 120 based on the capability information (e.g., regardless of whether that is the size actually implemented at the UE 120) received from the UE 120. In some instances, the BS 110 assumes the size of a soft buffer at the UE 120 by estimating the size of the soft buffer based on various factors. For example, the BS 110 may estimate buffer sizes at the UE 120 based on capability information provided by the UE 120 in one instance relative to capability information of other instances. For example, and as described in further detail below, the BS 110 may estimate a larger buffer size if a greater number of resources are allocated for communication between the BS 110 and the UE 120 when compared to instances where a smaller number of resources are allocated.

In certain aspects, for each RAT, based on the capability information received, the BS 110 may configure UE 120 for communicating with one or more SCells of the BS 110 for the RAT during the RRC connection procedure. The BS 110 may further configure UE 120 to use a defined number of spatial layers for each of the one or more SCells of the BS 110 for the RAT. When the UE 120 is configured to use one or more SCells by the BS 110, the SCells may be in a deactivated state (e.g., the SCells are not used by the UE 120 for communication with the BS 110) or in an activated state (e.g., the SCells are used by the UE 120 for communication with the BS 110). Accordingly, the BS 110 may allocate a number of CCs to use for CA for a RAT for the UE 120 and may further allocate a number of spatial layers for each of the CCs. However, the actual number of CCs used for CA for a RAT by the UE 120 to communicate with the BS 110 at a time may be less than the allocated number of CCs to use for CA.

In certain aspects, for each RAT, UE 120 is configured to (e.g., at least BS 110 assumes UE 120 is configured to) partition the soft buffer space equally among the allocated number of CCs to use for CA for communication with the BS 110 semi-statically (e.g., the partitions can change each time the UE 120 (re)connects to a BS 110). Based on the partition of the soft buffer for the CCs, BS 110 transmits encoded data over the CCs to the UE 120 so as not to send more encoded data than there is storage space available in the soft buffer for each CC. In this case, the partition is not a function of the bandwidth of each CC, nor is it a function of whether the CC is activated or deactivated. This can lead to inefficiencies, as space in the soft buffer may be allocated for CCs not being used, or more space may be allocated to CCs with smaller bandwidth (meaning less data is communicated), and therefore even though there is soft buffer space not being utilized, BS 110 may not send additional encoded data for a particular CC as the portion in the soft buffer allocated for storage of data for the CC may be considered full by the BS 110. Accordingly, certain aspects herein relate to techniques for managing a soft buffer space.

Though certain aspects are discussed herein with respect to managing soft buffers used for storing soft bits used for Hybrid Automatic Repeat reQuest (HARQ) for NR and LTE RATs, it should be noted that similar techniques may be used for other RATs and/or for storing other types of data for the RATs in other types of buffers.

In certain aspects, UE 120 is configured to report and the BS 110 is configured to receive both the capability information of the UE for a first RAT (e.g., LTE) and the capability information for a second RAT (e.g., NR). A first soft buffer size for a first soft buffer for the first RAT may be assumed by the BS 110 (e.g., and set by the UE 120) based on the capability information for the first RAT, and a second soft buffer size for a second soft buffer for the second RAT may be assumed by the BS 110 (e.g., and set by the UE 120) based on the capability information for the second RAT as discussed. Further, as discussed, the BS 110 may semi-statically allocate a first number of CCs and/or spatial layers for the UE 120 to use for communicating with the BS 110 using the first RAT and the BS 110 may semi-statically allocate a second number of CCs and/or spatial layers for the UE 120 to use for communicating with the BS 110 using the second RAT. The BS 110 may then assume that the UE 120 is (e.g., and the UE 120 may actually be) configured to allocate a portion of the first soft buffer for use for the first RAT based on the allocated first number of CCs and/or spatial layers of the first RAT, and allocate a remaining portion of the first soft buffer for use for the second RAT.

For example, for a first RAT, UE 120 may be capable of communicating on 5 CCs and 8 spatial layers per CC with BS 110 and indicate such capability to BS 110. Accordingly, the first soft buffer size of the first soft buffer for the first RAT may be assumed by the BS 110 as (e.g., and set by the UE 120 to) a size based on the capability of the UE to communicate on 5 CCs and 8 spatial layers per CC. The BS 110 may further semi-statically allocate 4 CCs for use for communication between UE 120 and BS 110, where for 3 of the CCs, 8 spatial layers are allocated for communication, and for 1 of the CCs, 4 spatial layers are allocated for communication. The BS 110 may then assume that the UE 120 is (e.g., and the UE 120 may actually be) configured to allocate portions of the first soft buffer between the first RAT and the second RAT based on the allocated CCs and/or spatial layers in relation to the number of CCs and/or spatial layers the UE 120 is capable of using for communication. The BS 110 may then transmit encoded data to the UE 120 based on the assumed configuration of allocated portions of the first soft buffer between the first RAT and the second RAT. In particular, the BS 110 may assume that the UE 120 may buffer data for the second RAT in the first soft buffer based on the allocation, and accordingly respond to a retransmission request with bits of encoded data for the second RAT to the UE 120 based on the assumption.

In certain aspects, the proportion of the first soft buffer assumed (e.g., and actually) allocated to the first RAT is equal to the ratio of the number of CCs allocated for communication by the BS 110 to the number of CCs the UE 120 is capable of using for communication. The remaining space in the first soft buffer may then be assumed (e.g., and actually) allocated to the second RAT. Based on the above example, 4 CCs are allocated, while the UE 120 is capable of communication on 5CCs for the first RAT, and therefore ⅘ (i.e., 80%) of the first soft buffer space is assumed (e.g., and actually) allocated to the first RAT, and the remaining ⅕ (i.e., 20%) is assumed (e.g., and actually) allocated to the second RAT.

In certain aspects, the proportion of the first soft buffer assumed (e.g., and actually) allocated to the first RAT is equal to the ratio of the number of spatial layers of the CCs allocated for communication by the BS 110 to the number of spatial layers of the CCs the UE 120 is capable of using for communication. The remaining space in the first soft buffer may then be assumed (e.g., and actually) allocated to the second RAT. Based on the above example, 4 CCs are allocated with 3 CCs having 8 spatial layers allocated and 1 CC having 4 spatial layers allocated, while the UE 120 is capable of communication on 5CCs each having 8 spatial layers for the first RAT, and therefore (3*8+1*4)/(5*8) (i.e., 70%) of the first soft buffer space is assumed (e.g., and actually) allocated to the first RAT, and the remaining 3/10 (i.e., 30%) is assumed (e.g., and actually) allocated to the second RAT.

Accordingly, the BS 110 assumes the UE 120 can (e.g., and the UE 120 actually can), based on the semi-static configuration of the UE 120 (e.g., allocation of CCs and/or spatial layers for communicating with BS 110), share the soft buffer space of one RAT for use for another RAT (e.g., storing soft bits corresponding to another RAT). In other aspects, the BS 110 assumes the UE 120 may (e.g., and the UE 120 actually may) share the soft buffer space of one RAT with another based on the dynamic configuration of the UE 120. For example, as discussed, the actual number of CCs activated for communication between BS 110 and UE 120 may differ from the allocated CCs. Accordingly, the proportion of a soft buffer assumed (e.g., and actually) allocated to a RAT may change based on the actual number of CCs activated (e.g., and corresponding spatial layers) in place of the allocated CCs, as discussed. Further, though sharing of space is discussed with respect to a second RAT utilizing the soft buffer of a first RAT, the opposite may also similarly be performed where a first RAT utilizes the soft buffer of a second RAT.

In some aspects, for the soft buffer of a first RAT to be used for storing soft bits for a second RAT, the physical memory the soft buffer is allocated may need to be suitable for use for the second RAT. For example, for LTE, the timing requirement for processing HARQ may be less stringent than for NR. For example, for NR, HARQ may need to be processed with greater speed/less latency, such as where HARQ may need to be processed on the same time slot as the transmission is received. Accordingly, the soft bits may need to be stored in high speed/low latency memory. If the physical memory backing the soft buffer for a first RAT is not suitable for storing soft bits for a second RAT, such sharing of soft buffer space from the first RAT to the second RAT may be disabled, or vice versa. However, sharing of a soft buffer space from the second RAT to a first RAT may still be feasible due to the first RAT having less stringent requirements than the second RAT, or vice versa. In certain aspects, BS 110 may indicate to UE 120 whether such sharing is feasible or not, such as during RRC connection, such as based on capability information of the UE 120 received by the BS 110 to make such a determination. Further, the BS 110 may then determine to transmit encoded data to the UE 120 based on whether such sharing is feasible or not.

In certain aspects, the assumed (e.g., and actual) partitioning of the portions of one or more soft buffers allocated for use by a RAT among CCs may be based on the number of subcarriers (e.g., physical resource blocks (PRBs)) of each of the CCs. For example, if a soft buffer space is assumed (e.g., and actually) allocated for use by a RAT across one or more soft buffers (e.g., for each soft buffer some soft buffer space is assumed (e.g., and actually) allocated as described), the soft buffer space may be assumed (e.g., and actually) partitioned into different subspaces, one subspace for each CC allocated or used for communication by UE 120 for the RAT. The amount of space assumed (e.g., and actually) allocated for each subspace may be proportional to the number of subcarriers of the corresponding CC. For example, if 3 CCs are allocated or used having a number of subcarriers of 3, 2, and 5, respectively, 3/(3+2+5) (i.e., 30%) may be assumed (e.g., and actually) allocated to the first CC, 2/(3+2+5) (i.e., 20%) may be assumed (e.g., and actually) allocated to the second CC, and 5/(3+2+5) (i.e., 50%) may be assumed (e.g., and actually) allocated to the third CC. In certain aspects, the amount of space assumed (e.g., and actually) allocated for each subspace may be proportional or based on the HARQ timing or TTI of the corresponding CC.

Though certain aspects are discussed herein with respect to soft buffer management for multiple CCs using CA, the techniques may also be used for soft buffer management where one or more RATs only use a single carrier wherein the proportions allocated to each of the RATs is based on resources other than CCs, such as PRBs, spatial layers, etc. Accordingly, in certain aspects, resources here may refer to CCs, PRBs, spatial layers, or other appropriate resources. For example, the proportion of the first soft buffer assumed (e.g., and actually) allocated to the first RAT may be based on a number of spatial layers and/or resources (e.g., PRBs) the UE 120 is capable of using to communicate with the BS 110 on the first RAT and the number of spatial layers and/or resources (e.g., PRBs) the UE 120 is allocated or actually uses to communicate with the BS 110. The remaining space in the first soft buffer may then be assumed (e.g., and actually) allocated to the second RAT. For example, the proportion of the first soft buffer assumed (e.g., and actually) allocated to the first RAT may be equal to the ratio of the number of spatial layers and/or resources (e.g., either one individually, sum of the two, some other function of the two, etc.) the UE 120 is capable of using to communicate with the BS 110 on the first RAT to the number of spatial layers and/or resources the UE 120 is allocated or actually uses to communicate with the BS 110.

Figure 7:
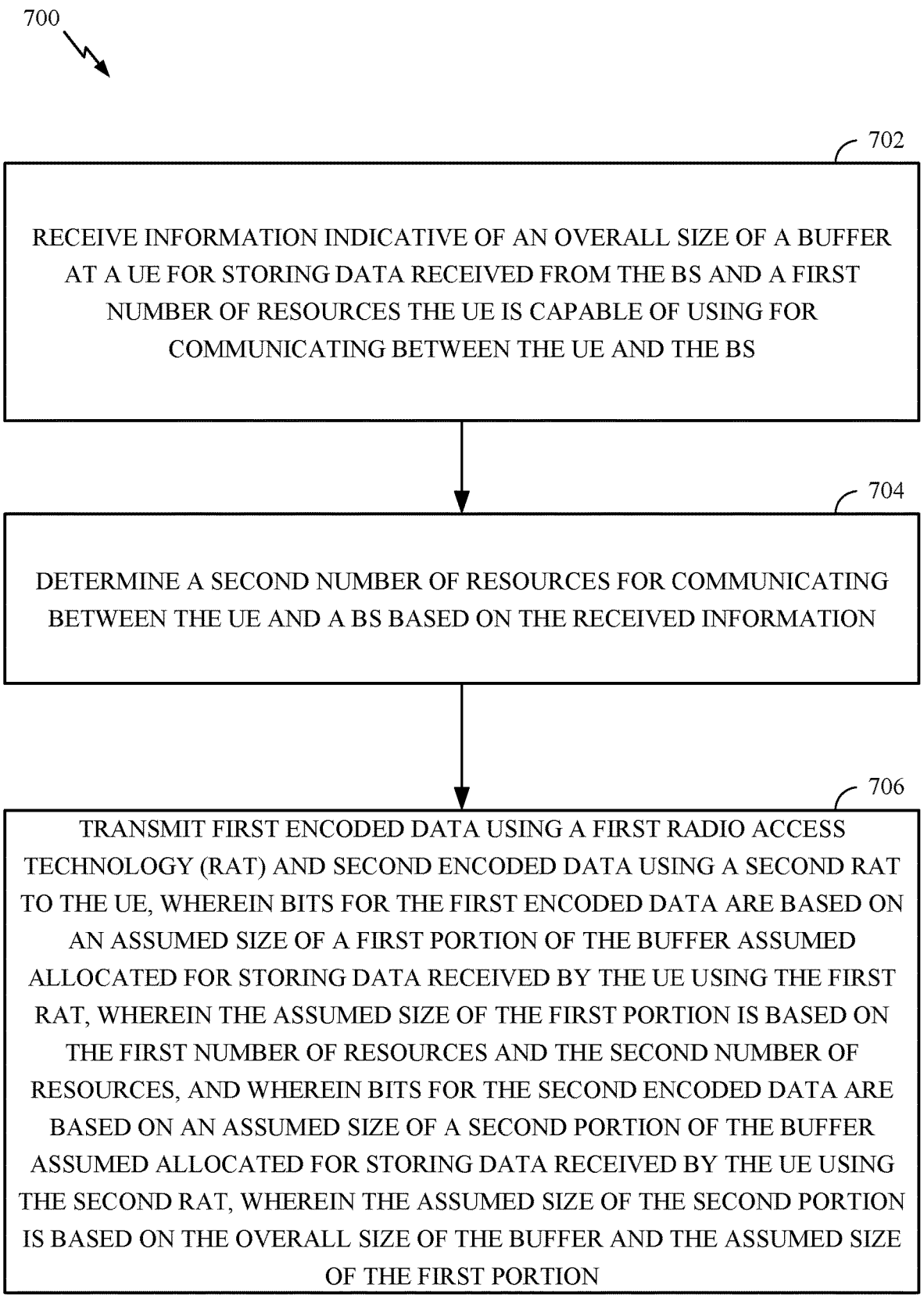
FIG. 7 illustrates example operations for soft buffer management for a UE, in accordance with certain aspects.

FIG. 7 illustrates example operations 700 for soft buffer management for a UE, in accordance with certain aspects. According to certain aspects, operations 700 may be performed by a BS (e.g., one or more of the BSs 110).

Operations 700 begin at 702 where the BS receives from a UE, information indicative of an overall size of a buffer at the UE for storing data received from the BS and a first number of resources the UE is capable of using for communicating between the UE and the BS (e.g., using a first RAT). For example, the BS receives capability information from the UE as discussed. At 704, the BS determines (e.g., allocates or configures for use) a second number of resources for communicating between the UE and the BS (e.g., using the first RAT) based on the received information. At 706, the BS transmits a first encoded data using a first radio access technology (RAT) and a second encoded data using a second RAT to the UE. The bits for the first encoded data are based on an assumed size of a first portion of the buffer assumed allocated for storing data received by the UE using the first RAT. The size of the first portion is based on the first number of resources and the second number of resources. The bits for the second encoded data are based on an assumed size of a second portion of the buffer assumed allocated for storing data received by the UE using the second RAT. The size of the second portion is based on the overall size of the buffer and the size of the first portion.

Figure 8:
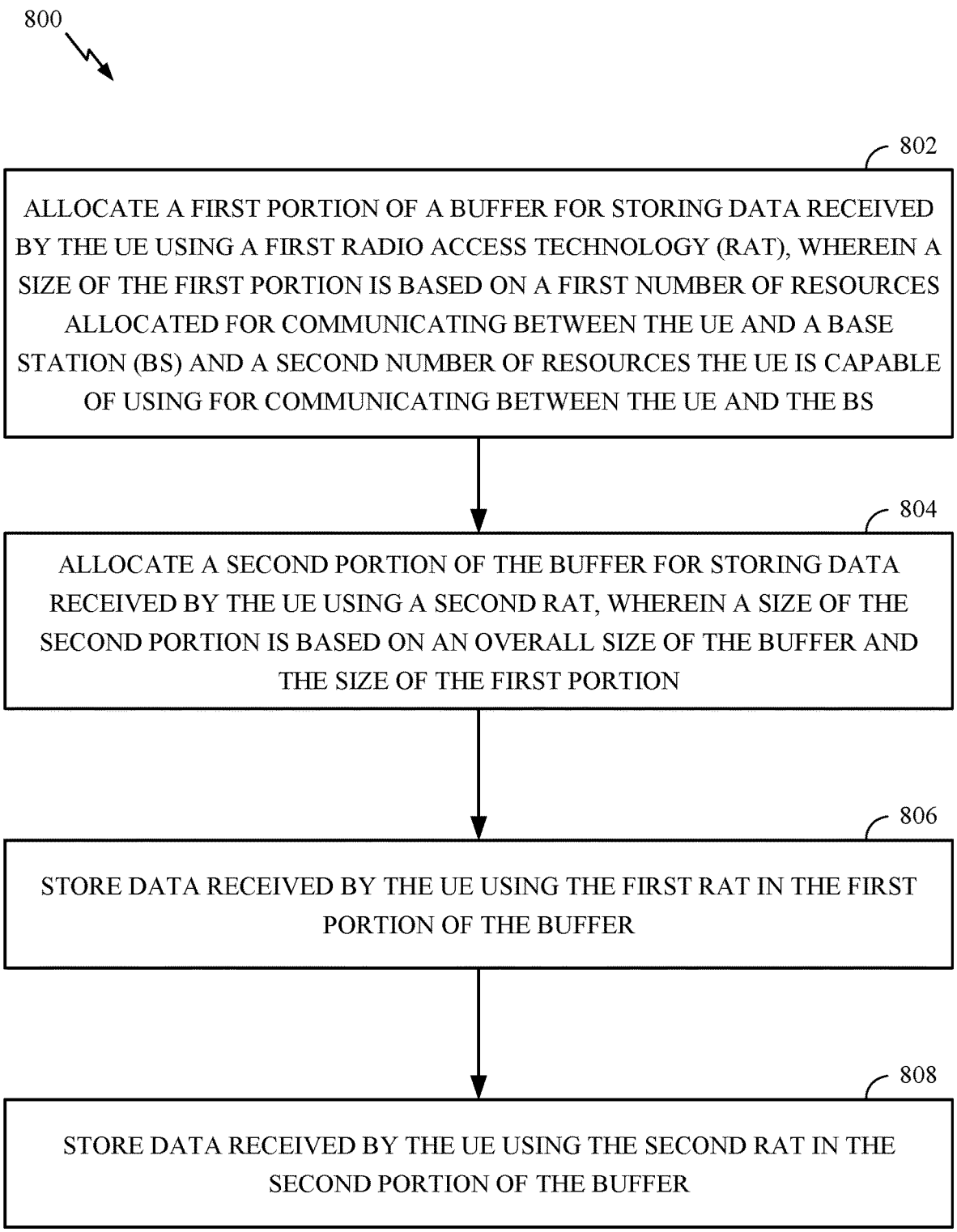
FIG. 8 illustrates example operations for soft buffer management at a UE, in accordance with certain aspects.

FIG. 8 illustrates example operations 800 for soft buffer management at a UE, in accordance with certain aspects. According to certain aspects, operations 800 may be performed by a UE (e.g., one or more of the UEs 120).

Operations 800 begin at 802 where UE 120 allocates a first portion of a buffer for storing data received by the UE using a first radio access technology (RAT), wherein a size of the first portion is based on a first number of resources allocated for communicating between the UE and a base station (BS) and a second number of resources the UE is capable of using for communicating between the UE and the BS. At 804, UE 120 allocates a second portion of the buffer for storing data received by the UE using a second RAT, wherein a size of the second portion is based on an overall size of the buffer and the size of the first portion. At 806, UE 120 stores data received by the UE using the first RAT in the first portion of the buffer. At 808, UE 120 stores data received by the UE using the second RAT in the second portion of the buffer.

Figure 9:
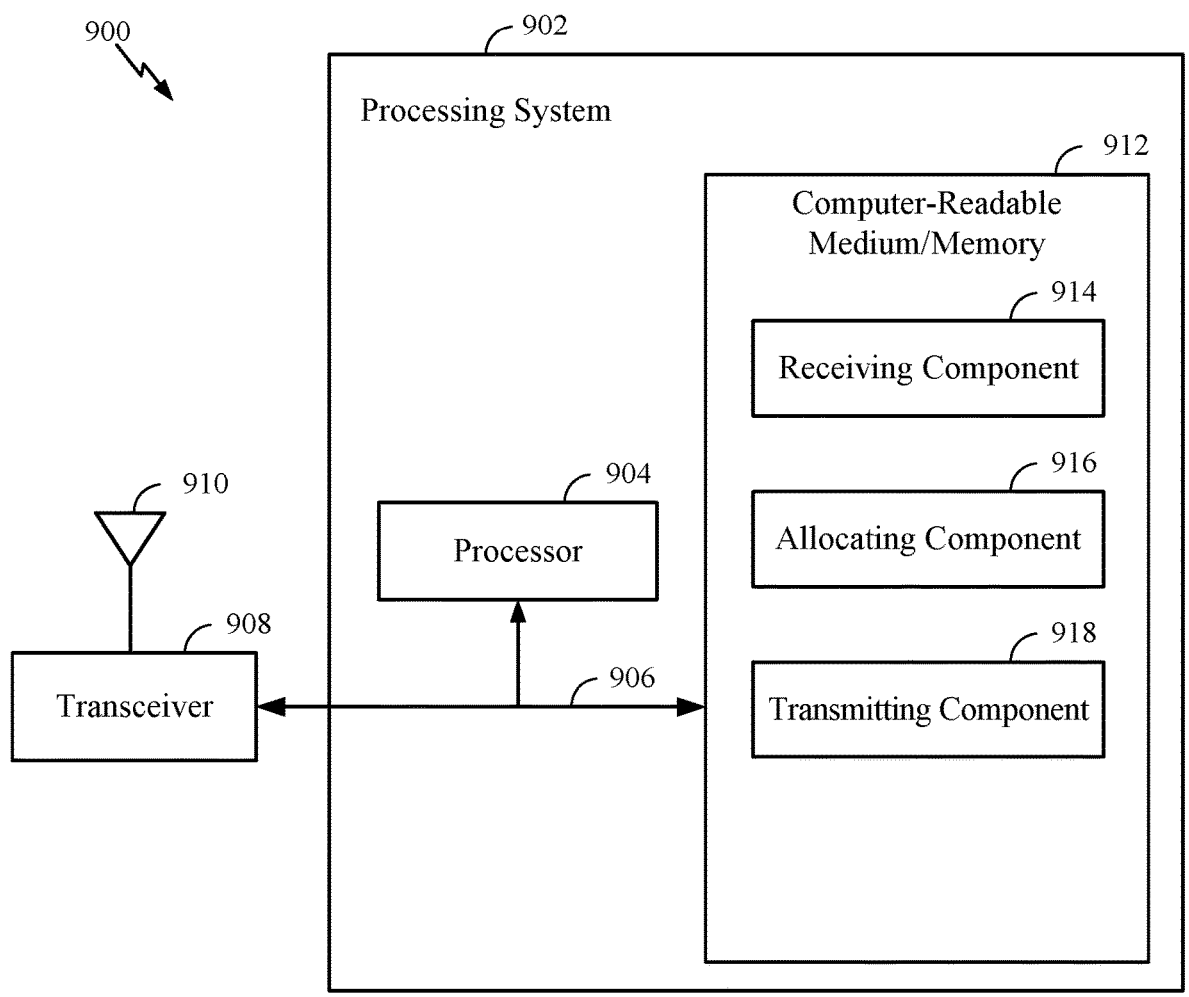
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 7. The communications device 900 includes a processing system 902 coupled to a transceiver 908. The transceiver 908 is configured to transmit and receive signals for the communications device 900 via an antenna 910, such as the various signal described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions that when executed by processor 904, cause the processor 904 to perform the operations illustrated in FIG. 7, or other operations for performing the various techniques discussed herein.

In certain aspects, the processing system 902 further includes a receiving component 914 for performing the operations illustrated in 702 of FIG. 7. Additionally, the processing system 902 includes an allocating component 916 for performing the operations illustrated in 704 of FIG. 7. Additionally, the processing system 902 includes a transmitting component 918 for performing the operations illustrated in 706 of FIG. 7. The receiving component 914, allocating component 916, and transmitting component 918 may be coupled to the processor 904 via bus 906. In certain aspects, the receiving component 914, allocating component 916, and transmitting component 918 may be hardware circuits. In certain aspects, the receiving component 914, allocating component 916, and transmitting component 918 may be software components that are executed and run on processor 904.

Figure 10:
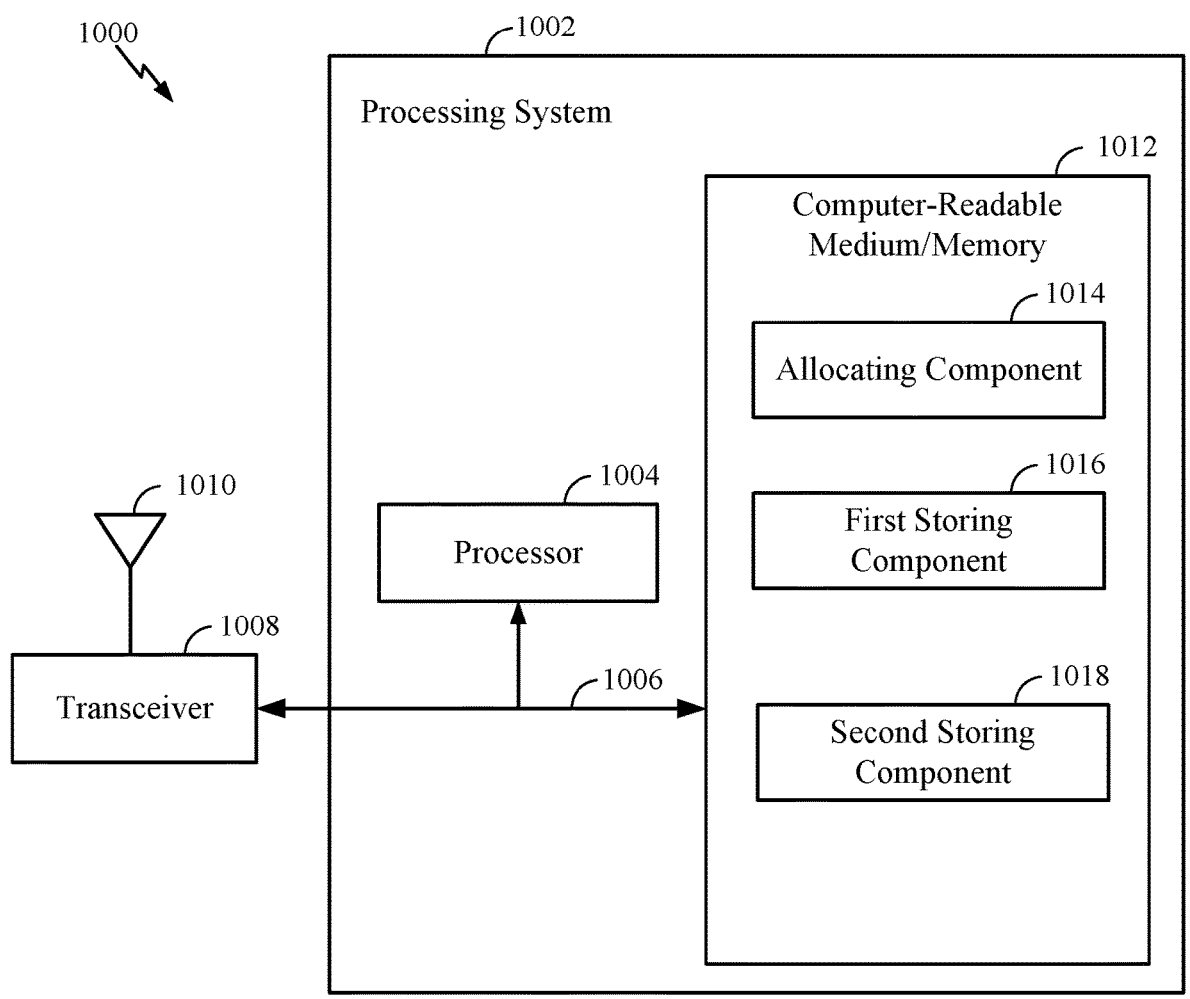
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008. The transceiver 1008 is configured to transmit and receive signals for the communications device 1000 via an antenna 1010, such as the various signal described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions that when executed by processor 1004, cause the processor 1004 to perform the operations illustrated in FIG. 8, or other operations for performing the various techniques discussed herein.

In certain aspects, the processing system 1002 further includes an allocating component 1014 for performing the operations illustrated in 802 and 804 of FIG. 8. Additionally, the processing system 1002 includes a first storing component 1016 for performing the operations illustrated in 806 of FIG. 8. Additionally, the processing system 1002 includes a second storing component 1018 for performing the operations illustrated in 808 of FIG. 8. The allocating component 1014, first storing component 1016, and second storing component 1018 may be coupled to the processor 1004 via bus 1006. In certain aspects, the allocating component 1014, first storing component 1016, and second storing component 1018 may be hardware circuits. In certain aspects, the allocating component 1014, first storing component 1016, and second storing component 1018 may be software components that are executed and run on processor 1004.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 7 and 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for buffer management for a user equipment (UE) for multiple radio access technologies, the method comprising:
   receiving, at a base station (BS) from the UE, information indicative of an overall size of a buffer at the UE for storing data received from the BS and a first number of resources the UE is capable of using for communicating between the UE and the BS using a first radio access technology (RAT);
   determining, by the BS, a second number of resources for communicating between the UE and the BS using the first RAT based on the received information; and
   transmitting, by the BS, first encoded data using the first RAT and second encoded data using a second RAT to the UE, wherein bits for the first encoded data are based on an assumed size of a first portion of the buffer assumed allocated for storing data received by the UE using the first RAT, wherein the assumed size of the first portion is based on the first number of resources and the second number of resources, and wherein bits for the second encoded data are based on an assumed size of a second portion of the buffer assumed allocated for storing data received by the UE using the second RAT, wherein the assumed size of the second portion is based on the overall size of the buffer and the assumed size of the first portion, wherein the assumed size of the first portion is equal to the second number of resources divided by the first number of resources multiplied by the overall size of the buffer, wherein the assumed size of the second portion is equal to the overall size of the buffer minus the size of the first portion, and wherein the assumed size of the second portion is independent of a third number of resources the UE is capable of using for communicating between the UE and the BS using the second RAT.

2. The method of claim 1, wherein the first number of resources comprises a first number of component carriers, and wherein the second number of resources comprises a second number of component carriers, and further comprising assuming partitioning of the first portion of the buffer into subspaces, each subspace being associated with one of the second number of component carriers, wherein transmitting the bits for the first encoded data comprises transmitting certain of the bits for the first encoded data over the second number of component carriers based on the assumed partitioning of the first portion of the buffer into subspaces.

3. The method of claim 2, wherein a size of each subspace is based on a number of subcarriers or physical resource blocks associated with a corresponding one of the second number of component carriers.

4. The method of claim 2, wherein a size of each subspace is based on a Hybrid Automatic Repeat reQuest (HARQ) timing or a transmission time interval (TTI) associated with a corresponding one of the second number of component carriers.

5. The method of claim 1, further comprising:
   receiving, at the BS from the UE, one or more requests for retransmission of encoded data transmitted to the UE using one of the first RAT or the second RAT, wherein bits retransmitted to the UE using the one of the first RAT or the second RAT are based on the assumed size of the first portion of the buffer or the assumed size of the second portion of the buffer.

6. The method of claim 1, wherein the second number of resources comprises one of a number of resources allocated for communicating or a number of resources used for communicating.

7. The method of claim 1, wherein the first number of resources comprises one or more of a first number of component carriers or a first number of spatial layers, and wherein the second number of resources comprises one or more of a second number of component carriers or a second number of spatial layers.

8. The method of claim 1, wherein the received information comprises capability information of the UE for the first RAT, and further comprising:
   receiving, by the BS from the UE, the capability information of the first RAT and capability information of the second RAT together; and
   transmitting, by the BS to the UE, an indication of the second number of resources.

9. The method of claim 1, further comprising transmitting an indication by the BS to the UE that the buffer can be used to store data corresponding to the first RAT and the second RAT.

10. The method of claim 1, further comprising receiving, at the BS from the UE, information indicative of an overall size of a second buffer at the UE for storing data received from the BS and the third number of resources the UE is capable of using for communicating between the UE and the BS using the second RAT, wherein bits for the second encoded data are further based on an assumed size of at least a portion of the second buffer.

11. A base station (BS) comprising:
    a memory; and
    a processor coupled to the memory, the processor being configured to:
       receive, from a user equipment (UE), information indicative of an overall size of a buffer at the UE for storing data received from the BS and a first number of resources the UE is capable of using for communicating between the UE and the BS using a first radio access technology (RAT);
       determine a second number of resources for communicating between the UE and the BS using the first RAT based on the received information; and
       transmit first encoded data using the first RAT and second encoded data using a second RAT to the UE, wherein bits for the first encoded data are based on an assumed size of a first portion of the buffer assumed allocated for storing data received by the UE using the first RAT, wherein the assumed size of the first portion is based on the first number of resources and the second number of resources, and wherein bits for the second encoded data are based on an assumed size of a second portion of the buffer assumed allocated for storing data received by the UE using the second RAT, wherein the assumed size of the second portion is based on the overall size of the buffer and the assumed size of the first portion, wherein the assumed size of the first portion is equal to the second number of resources divided by the first number of resources multiplied by the overall size of the buffer, wherein the assumed size of the second portion is equal to the overall size of the buffer minus the size of the first portion, and wherein the assumed size of the second portion is independent of a third number of resources the UE is capable of using for communicating between the UE and the BS using the second RAT.

12. The base station of claim 11, wherein the first number of resources comprises a first number of component carriers, and wherein the second number of resources comprises a second number of component carriers, and wherein the processor is further configured to assume partitioning of the first portion of the buffer into subspaces, each subspace being associated with one of the second number of component carriers, wherein to transmit the bits for the first encoded data comprises to transmit certain of the bits for the first encoded data over the second number of component carriers based on the assumed partitioning of the first portion of the buffer into subspaces.

13. The base station of claim 12, wherein a size of each subspace is based on a number of subcarriers or physical resource blocks associated with a corresponding one of the second number of component carriers.

14. The base station of claim 12, wherein a size of each subspace is based on a Hybrid Automatic Repeat reQuest (HARQ) timing or a transmission time interval (TTI) associated with a corresponding one of the second number of component carriers.

15. The base station of claim 11, wherein the processor is further configured to:
receive, from the UE, one or more requests for retransmission of encoded data transmitted to the UE using one of the first RAT or the second RAT, wherein bits retransmitted to the UE using the one of the first RAT or the second RAT are based on the assumed size of the first portion of the buffer or the assumed size of the second portion of the buffer.

16. The base station of claim 11, wherein the second number of resources comprises one of a number of resources allocated for communicating or a number of resources used for communicating.

17. The base station of claim 11, wherein the first number of resources comprises one or more of a first number of component carriers or a first number of spatial layers, and wherein the second number of resources comprises one or more of a second number of component carriers or a second number of spatial layers.

18. The base station of claim 11, wherein the received information comprises capability information of the UE for the first RAT, and wherein the processor is further configured to:
receive, from the UE, the capability information of the first RAT and capability information of the second RAT together; and
transmit, to the UE, an indication of the second number of resources.

19. The base station of claim 11, wherein the processor is further configured to transmit an indication to the UE that the buffer can be used to store data corresponding to the first RAT and the second RAT.

20. The BS of claim 11, wherein the processor is further configured to receive, from the UE, information indicative of an overall size of a second buffer at the UE for storing data received from the BS and the third number of resources the UE is capable of using for communicating between the UE and the BS using the second RAT, wherein bits for the second encoded data are further based on an assumed size of at least a portion of the second buffer.

21. A base station (BS) comprising:
means for receiving, from a user equipment (UE), information indicative of an overall size of a buffer at the UE for storing data received from the BS and a first number of resources the UE is capable of using for communicating between the UE and the BS using a first radio access technology (RAT);
means for determining a second number of resources for communicating between the UE and the BS using the first RAT based on the received information; and
means for transmitting first encoded data using the first RAT and second encoded data using a second RAT to the UE, wherein bits for the first encoded data are based on an assumed size of a first portion of the buffer assumed allocated for storing data received by the UE using the first RAT, wherein the assumed size of the first portion is based on the first number of resources and the second number of resources, and wherein bits for the second encoded data are based on an assumed size of a second portion of the buffer assumed allocated for storing data received by the UE using the second RAT, wherein the assumed size of the second portion is based on the overall size of the buffer and the assumed size of the first portion, wherein the assumed size of the first portion is equal to the second number of resources divided by the first number of resources multiplied by the overall size of the buffer, wherein the assumed size of the second portion is equal to the overall size of the buffer minus the size of the first portion, and wherein the assumed size of the second portion is independent of a third number of resources the UE is capable of using for communicating between the UE and the BS using the second RAT.

22. The base station of claim 21, further comprising:
means for receiving, from the UE, one or more requests for retransmission of encoded data transmitted to the UE using one of the first RAT or the second RAT, wherein bits retransmitted to the UE using the one of the first RAT or the second RAT are based on the assumed size of the first portion of the buffer or the assumed size of the second portion of the buffer.

23. The base station of claim 21, wherein the second number of resources comprises one of a number of resources allocated for communicating or a number of resources used for communicating.

24. The base station of claim 21, wherein the first number of resources comprises one or more of a first number of component carriers or a first number of spatial layers, and wherein the second number of resources comprises one or more of a second number of component carriers or a second number of spatial layers.

25. The BS of claim 21, further comprising means for receiving, at the BS from the UE, information indicative of an overall size of a second buffer at the UE for storing data received from the BS and the third number of resources the UE is capable of using for communicating between the UE and the BS using the second RAT, wherein bits for the second encoded data are further based on an assumed size of at least a portion of the second buffer.

26. A non-transitory computer readable storage medium that stores instructions that when executed by a base station (BS) causes the base station to perform a method for buffer management for a user equipment (UE) for multiple radio access technologies, the method comprising:
receiving, at the BS from the UE, information indicative of an overall size of a buffer at the UE for storing data received from the BS and a first number of resources the UE is capable of using for communicating between the UE and the BS using a first radio access technology (RAT);

determining, by the BS, a second number of resources for communicating between the UE and the BS using the first RAT based on the received information; and transmitting, by the BS, first encoded data using the first RAT and second encoded data using a second RAT to the UE, wherein bits for the first encoded data are based on an assumed size of a first portion of the buffer assumed allocated for storing data received by the UE using the first RAT, wherein the assumed size of the first portion is based on the first number of resources and the second number of resources, and wherein bits for the second encoded data are based on an assumed size of a second portion of the buffer assumed allocated for storing data received by the UE using the second RAT, wherein the assumed size of the second portion is based on the overall size of the buffer and the assumed size of the first portion, wherein the assumed size of the first portion is equal to the second number of resources divided by the first number of resources multiplied by the overall size of the buffer, wherein the assumed size of the second portion is equal to the overall size of the buffer minus the size of the first portion, and wherein the assumed size of the second portion is independent of a third number of resources the UE is capable of using for communicating between the UE and the BS using the second RAT.

27. The non-transitory computer readable storage medium of claim 26, wherein the method further comprises:

receiving, at the BS from the UE, one or more requests for retransmission of encoded data transmitted to the UE using one of the first RAT or the second RAT, wherein bits retransmitted to the UE using the one of the first RAT or the second RAT are based on the assumed size of the first portion of the buffer or the assumed size of the second portion of the buffer.

28. The non-transitory computer readable storage medium of claim 26, wherein the second number of resources comprises one of a number of resources allocated for communicating or a number of resources used for communicating.

29. The non-transitory computer readable storage medium of claim 26, wherein the first number of resources comprises one or more of a first number of component carriers or a first number of spatial layers, and wherein the second number of resources comprises one or more of a second number of component carriers or a second number of spatial layers.

30. The non-transitory computer readable storage medium of claim 26, wherein the method further comprises receiving, at the BS from the UE, information indicative of an overall size of a second buffer at the UE for storing data received from the BS and the third number of resources the UE is capable of using for communicating between the UE and the BS using the second RAT, wherein bits for the second encoded data are further based on an assumed size of at least a portion of the second buffer.

* * * * *